June 7, 1927.
A. PINTO
CARROUSEL
Filed Oct. 6, 1924
1,631,331
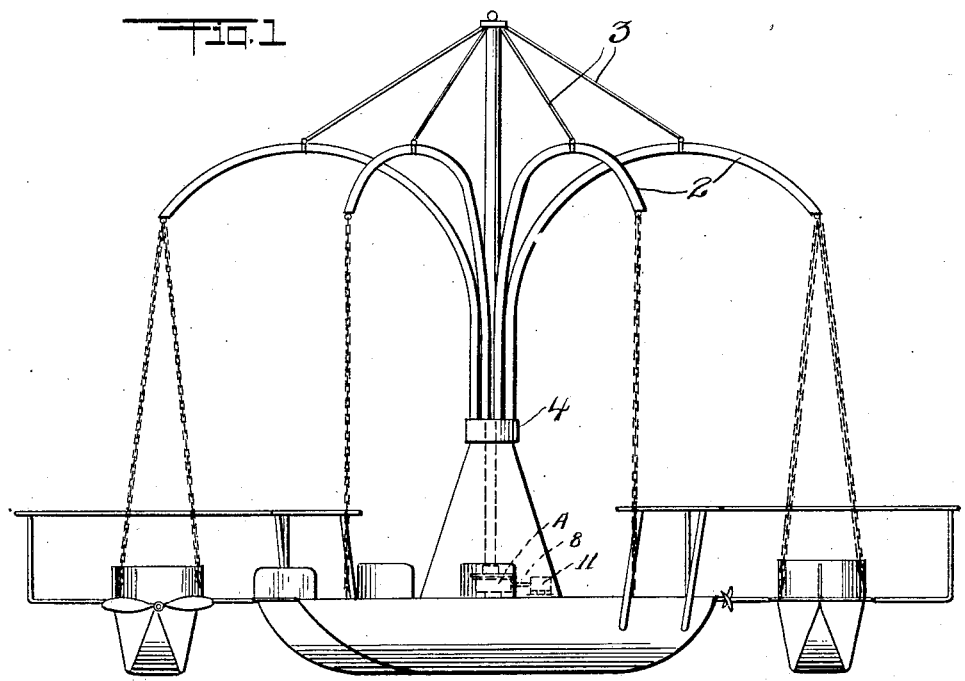
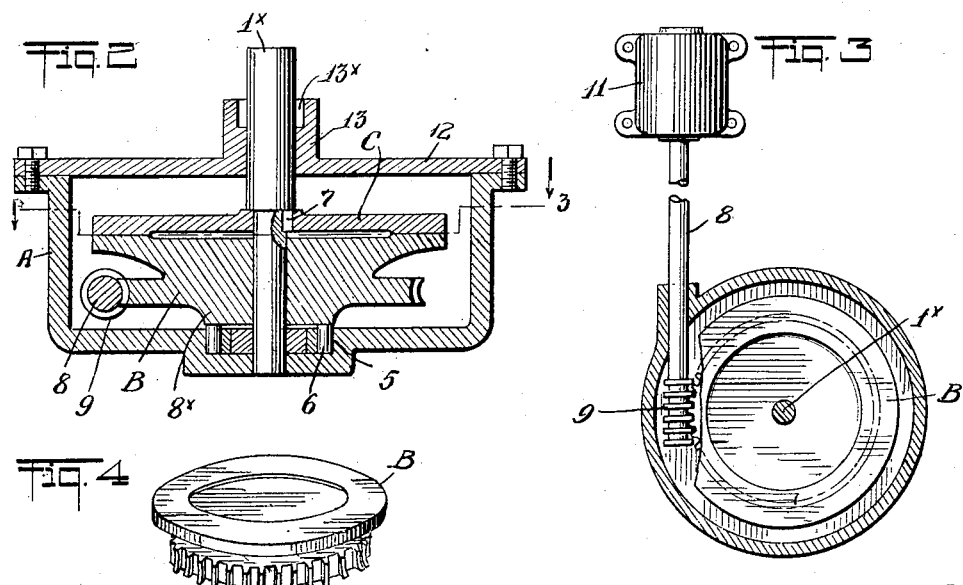
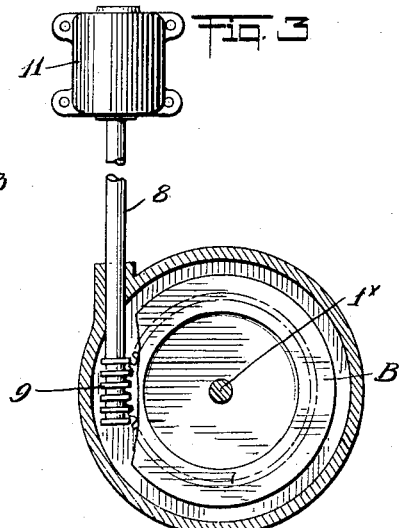
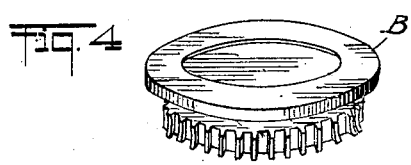
INVENTOR
ANGELO PINTO
BY
HIS ATTORNEY Patented June 7, 1927.

1,631,331

UNITED STATES PATENT OFFICE.

ANGELO PINTO, OF BROOKLYN, NEW YORK.

CARROUSEL.

Application filed October 6, 1924. Serial No. 741,814.

The principal object of the invention is to provide driving means for the carrousel and like apparatus of such construction as to gradually start and stop the apparatus with momentum strain upon the driving elements, to provide means whereby a motor may be employed as the primary driving member and connected by shaft and gearing connections to the carrousel drive and the elements of the latter so constructed and arranged that the motor may be stopped and the rotation of the gears immediately arrested whilst the carrousel continues its movement under momentum.

A further object of the invention is to so provide the drive that the gearing and shaft connections act as brake elements to gradually stop the rotation of the carrousel when the motor is shut off. Further objects will hereinafter appear.

The invention will be understood by reference to the accompanying drawings in which—

Fig. 1 is a perspective view of the airplane swing type, showing in dotted lines the application of the driving apparatus.

Fig. 2 is a vertical section through the driving apparatus.

Fig. 3 is a horizontal section on the line 3—3, Fig. 2.

Fig. 4 is a perspective view of the lowermost friction disk embodied in the apparatus.

By reference to Fig. 1 of the drawings it will be seen that the top carrousel therein shown embodies a main vertical shaft and a plurality of davit arms 2 connected to the central shaft by stay rods or cables 3 and being secured at their base to a ring or collar 4 which is carried by the main shaft. The main shaft 1 is formed either integrally with a drive shaft $1^x$ or secured to the same in any suitable manner. Drive shaft $1^x$ is centrally disposed within a casing A, which casing is formed at its base with annular pocket 5 to receive a roller bearing 6 upon the top of which directly rests the annular face of a combined worm gear and frictional driving disc B. Disposed upon friction disc B is a second friction disc C which is secured by key 7 to the drive shaft $1^x$. The combined worm and friction wheel B is loose upon shaft $1^x$. Formed in casing A is a boss which is apertured to receive the worm shaft 8 provided with a worm 9 in engagement with the teeth of the worm wheel. The worm shaft 8 may be directly connected to the motor 11 or the connection may be through any suitable medium such as sprocket and chain devices. Casing A is provided with a cover 12 having a vertical boss 13 apertured to receive the shaft and afford a bearing therefor, the boss at its top being formed with an annular oil cup $13^x$.

In the operation of the device, assuming that the carrousel is motionless, the motor is operated and worm 9 in its movement will rotate the worm wheel forming part of member B. Member B is loose on the shaft $1^x$, through its frictional contact with friction wheel C, and will gradually effect a rotation of the latter until there is no slip between it and member B and the two rotate as one. Should the carrousel become jammed or otherwise overloaded this will not damage the driving elements, particularly the teeth of the worm and worm wheel, inasmuch as the construction permits a slip between the friction wheels. When the motor is shut off, the momentum of the carrousel will cause its continued movement with friction wheel C, but the opposed friction wheel will act as a brake to gradually stop rotation of the carrousel.

It will be understood that various changes may be made in the structure illustrated without departing from the spirit of my invention, what I claim and desire to secure by Letters Patent being as follows:—

In carrousels, a casing, a shaft passing into said casing, the shaft being adapted to support rotating carriers, a thrust bearing disposed in a seat within the casing, the bearing being apertured to receive an end of said shaft, a friction disk lying under a shoulder on the shaft and thereby adapted to receive the weight of the shaft and its load, the disk being keyed to the shaft, a second friction disk loosely mounted on the shaft below the first disk and supported by said thrust bearing and means for rotating said last named disk.

In testimony whereof, I have signed my name to this specification.

ANGELO PINTO.